United States Patent
Sobers

(10) Patent No.: US 6,370,683 B1
(45) Date of Patent: Apr. 9, 2002

(54) COMPUTER SOFTWARE FOR GENERATING FLOWCHART IMAGES OF A SOURCE PROGRAM

(76) Inventor: Arnold Sobers, 41/43 Normandy Pl., Irvington, NJ (US) 07111

( * ) Notice: Subject to any disclaimer, the term of this patent is extended or adjusted under 35 U.S.C. 154(b) by 0 days.

(21) Appl. No.: 09/306,642

(22) Filed: May 7, 1999

(51) Int. Cl.⁷ .............................................. G06F 9/445

(52) U.S. Cl. ...................................................... 717/3

(58) Field of Search .............................. 717/3, 2, 4, 5, 717/8, 9

(56) References Cited

U.S. PATENT DOCUMENTS

| | | | | |
|---|---|---|---|---|
| 4,831,525 A | * | 5/1989 | Saito et al. .................... | 717/3 |
| 4,956,773 A | * | 9/1990 | Saito et al. .................... | 717/3 |
| 5,005,119 A | * | 4/1991 | Rumbaugh et al. ............ | 717/3 |
| 5,187,788 A | * | 2/1993 | Marmelstein .................. | 717/3 |
| 5,386,508 A | | 1/1995 | Itonori et al. ............... | 395/701 |
| 5,414,847 A | | 5/1995 | Tsukakoshi .................... | 705/1 |
| 5,414,853 A | | 5/1995 | Fertig et al. ................. | 395/702 |
| 5,442,779 A | * | 8/1995 | Barber et al. .................. | 707/4 |
| 5,491,821 A | * | 2/1996 | Kilis ............................. | 717/7 |
| 5,493,680 A | * | 2/1996 | Danforth ....................... | 717/2 |
| 5,507,030 A | * | 4/1996 | Sites .............................. | 717/4 |
| 5,522,078 A | | 5/1996 | Matsuzuki .................... | 395/702 |
| 5,539,869 A | | 7/1996 | Spoto et al. .................. | 345/336 |
| 5,551,015 A | * | 8/1996 | Goettelmann et al. ......... | 717/5 |
| 5,561,803 A | * | 10/1996 | Kilis ............................. | 717/7 |
| 5,617,578 A | * | 4/1997 | Kroll et al. .................. | 395/800 |
| 5,649,302 A | * | 7/1997 | Ayerst et al. .................. | 717/9 |
| 5,652,889 A | * | 7/1997 | Sites .............................. | 717/8 |
| 5,675,801 A | * | 10/1997 | Lindsey ......................... | 717/2 |
| 5,692,195 A | * | 11/1997 | Conner et al. ............... | 709/316 |
| 5,694,601 A | * | 12/1997 | White .......................... | 709/101 |

(List continued on next page.)

FOREIGN PATENT DOCUMENTS

| | | |
|---|---|---|
| EP | 0 211 151 | 9/1992 |
| EP | 0 546 794 | 6/1993 |

OTHER PUBLICATIONS

Object–Oriented Modeling and Design—James Rumbaugh, Michael Blaha, William Premerlani, Frederick Eddy, William Lorensen—Nov. 14, 1990, Chapter 18.*
AS/400 Applications: Year 2000 Enablement & Services Considerations (Jan. 1997), IBM International Technical Support Organization Rochester Center.*
Digital Unix—Object File/Symbol Table Format Specification Version 5.0 of higher, Jul. 1998, digital.*

Primary Examiner—Mark R. Powell
Assistant Examiner—Michael B. Holmes

(57) ABSTRACT

Computer software for generating flowchart images of a source program. The computer software includes a first program which reads an input program source code as an input and generates a coded output file containing codes that a second program uses to create the shapes of the flowchart or list the copybooks and called programs used in the input program source code being flowcharted. Each line of the source program input is checked character for character for 'reserved words' of the source program language. When a 'reserved word' is found then a shape code is created. A single program flowchart can be created or by selecting a key word "AUTO", multiple program flowcharts can be created. The coded output file contains first, second, and third fields. The first field contains a three character shape identifier (the computer software includes 25 predefined shape identifiers). The second field contains a view number and a shape position. The view number indicates a particular flowchart screen for the program flowchart. The shape position indicates a particular position of a flowchart screen. Each flowchart screen can show up to nine shape positions. The second program of the inventive software reads the coded output file of the first program and displays the program flowchart images screen by screen.

8 Claims, 7 Drawing Sheets

U.S. PATENT DOCUMENTS

| | | | |
|---|---|---|---|
| 5,724,590 A | * 3/1998 | Goettelmann et al. | 717/7 |
| 5,729,747 A | 3/1998 | Tsukakoshi | 395/702 |
| 5,758,160 A | * 5/1998 | McInerney et al. | 717/3 |
| 5,784,286 A | 7/1998 | Hirose et al. | 364/488 |
| 5,784,621 A | 7/1998 | Onishi et al. | 395/702 |
| 5,790,863 A | 8/1998 | Simonyi | 395/707 |
| 5,815,653 A | 9/1998 | You et al. | 395/183.14 |
| 5,835,771 A | 11/1998 | Veldhuizen | 395/705 |
| 5,850,548 A | 12/1998 | Williams | 395/701 |
| 5,875,331 A | * 2/1999 | Lindsey | 717/2 |

* cited by examiner

COMPUTER SOFTWARE FOR GENERATING FLOWCHART IMAGES OF A SOURCE PROGRAM

BACKGROUND OF THE INVENTION

1. Field of the Invention

The present invention relates to computer software for creating, modifying, and manipulating charts and diagrams in order to display software programs in the form of flowchart images (i.e., diagrams containing a plurality of boxes, and connecting lines).

2. Description of the Related Art

The use of personal computers has become widespread for a variety of functions and applications in business and education. One such application of computers is their use for producing, printing and displaying graphical images. Still more particularly, a variety of application programs have been developed for creating flowcharts, organizational charts, and various other diagrams. Such existing systems provide for the creation of various drawing elements and their interconnection. For example, there are a variety of complex computer aided design or drafting programs for creating any type of mechanical, electrical and architectural drawings. There are also more simplistic drawing programs for creating only flowcharts or organizational charts.

One major problem with the existing flowcharting and drawing programs is that they are very difficult to use. The complex computer aided design programs usually require a significant amount of training to be used and are typically only used by skilled draftspersons. Even the more simplistic drawing programs with reduced functionality are cumbersome and difficult to use. For example, existing systems require a number of key strokes or inputs from a mouse type controller to create a simple shape or symbol in a chart, such as a rectangular box. To create a flowchart symbol, a symbol is first chosen from the symbol palette or menu displayed on a monitor. The symbol is then dragged and dropped using a mouse type controller into a desired position in the drawing. Alternatively, the symbol could be created and positioned using various other keystrokes or combinations of keystrokes and mouse inputs. Once the symbol has been added, it typically must be connected with other elements in the drawing. This requires similar manipulations of the input device to add a simple connecting line. Having to repeatedly reposition the cursor from one area of the drawing to a palette or menu for adding each element or changing the functionality provided by manipulation of the cursor is highly inefficient. Creating and drawing such drawings is therefore very labor intensive and time consuming. Thus, there is a need for a system that makes drawing elements easier to create.

The related art is represented by the following patents of interest.

U.S. Pat. No. 5,386,508, issued on Jan. 31, 1995 to Katsuhiko Itonori et al., describes a program generator for generating a coded computer program from program representations that are easy to understand for humans as exemplified by flowcharts which are composed of the combination of line graphics and characters. Itonori et al. do not suggest computer software for generating flowchart images of a source program according to the claimed invention.

U.S. Pat. No. 5,414,847, issued on May 9, 1995 to Toshiharu Tsukakoshi, describes a program design method and apparatus capable of successively handling over definition information between processes, from a preceding process to its succeeding process and consistently conducting development of a program using a distributed computer independent of a host computer. Tsukakoshi 847 does not suggest computer software for generating flowchart images of a source program according to the claimed invention.

U.S. Pat. No. 5,414,853, issued on May 9, 1995 to Paul Fertig et al., describes a restriction checker generator for generating a restriction checker for checking horizontal microcode against restrictions which the microcode instructions must satisfy in order to be valid. Fertig et al. do not suggest computer software for generating flowchart images of a source program according to the claimed invention.

U.S. Pat. No. 5,522,078, issued on May 28, 1996 to Tadeo Matsuzuki, describes an automatic program generating apparatus capable of uniformly generating an accurate, error-free program in accordance with an industrial technique, and allowing simple operations in the design process to shorten the program generating time. Matsuzuki does not suggest computer software for generating flowchart images of a source program according to the claimed invention.

U.S. Pat. No. 5,539,869, issued on Jul. 23, 1996 to Thomas A. Spoto et al., describes a method and system for processing and presenting on-line, multimedia information in a tree structure. Spoto et al. do not suggest computer software for generating flowchart images of a source program according to the claimed invention.

U.S. Pat. No. 5,617,578, issued on Apr. 1, 1997 to Yury Kroll et al., describes a computer-based workstation which extracts the logical structures from a source text, and presents them in the form of a logic diagram. Kroll et al. do not suggest computer software for generating flowchart images of a source program according to the claimed invention.

U.S. Pat. No. 5,729,747, issued on Mar. 17, 1998 to Toshiharu Tsukakoshi, describes a program design method and apparatus capable of successively handling over definition information between processes, from a preceding process to its succeeding process and consistently conducting development of a program using a distributed computer independent of a host computer. Tsukakoshi '747 does not suggest computer software for generating flowchart images of a source program according to the claimed invention.

U.S. Pat. No. 5,784,286, issued on Jul. 21, 1998 to Atsushi Hirose et al., describes a design process recording method and a design process recorder which implements the design process recording method. Hirose et al. do not suggest computer software for generating flowchart images of a source program according to the claimed invention.

U.S. Pat. No. 5,784,621, issued on Jul. 21, 1998 to Yasushi Onishi et al., describes a sequence program display apparatus for displaying a sequence program to be executed by a programmable controller on a screen. Onishi et al. do not suggest computer software for generating flowchart images of a source program according to the claimed invention.

U.S. Pat. No. 5,790,863, issued on Aug. 4, 1998 to Charles Simonyi, describes a method and system for generating a computer program. Simonyi does not suggest computer software for generating flowchart images of a source program according to the claimed invention.

U.S. Pat. No. 5,815,653, issued on Sep. 29, 1998 to Lawrence L. You et al., describes a system for debugging software using a portable debug environment-independent client debugger object and at least one non-portable server debugger object with platform specific debugging logic. You et al. do not suggest computer software for generating flowchart images of a source program according to the claimed invention.

U.S. Pat. No. 5,835,771, issued on Nov. 10, 1998 to Todd Veldhuizen, describes the capability to generate customized, inclined code using template metaprograms. Veldhuizen does not suggest computer software for generating flowchart images of a source program according to the claimed invention.

U.S. Pat. No. 5,850,548, issued on Dec. 15, 1998 to David M. Williams, describes a development system comprising a visual programming environment based on a high level hierarchial data flow model. Williams does not suggest computer software for generating flowchart images of a source program according to the claimed invention.

European Patent document 0 211 151 B1, published on Sep. 9, 1992, describes a technique for programming the order of cells for an operator to enter data in a spreadsheet. European '151 does not suggest computer software for generating flowchart images of a source program according to the claimed invention.

European Patent document 0 546 794 A2, published on Jun. 16, 1993, describes a method, system, and program for isolating the executable binary form of computer applications that use object definition libraries from changes in the implementation or specification of object definitions in the library. European '794 does not suggest computer software for generating flowchart images of a source program according to the claimed invention.

None of the above inventions and patents, taken either singularly or in combination, is seen to describe the instant invention as claimed.

SUMMARY OF THE INVENTION

The present invention is computer software for generating flowchart images of a source program. The hardware for implementing the above is not particularly limitative, and the preferred embodiment has been designed for computer systems which normally include a keyboard and/or transducer (mouse) input devices, a resolution monitor, a printer system, a microprocessor based central processing unit (CPU), and a memory capability, such as a hard disk drive. Normally, the memory will store the computer software according to the invention which includes program instructions defining the inventive controlling logic. The CPU implements the programmed control instructions. The inventive controlling logic instructions may be coded in a variety of programming languages consistent and compatible with the associated hardware.

A logic flow chart depicting the overall logic structure a associated with a first program of the inventive computer software conceptually starts wherein a user inputs an input program source code. The first program reads the input program source code as an input and a coded output file is written containing codes that a second program uses to create the shapes of the flowchart or first the copybooks and called programs used in the input program source code being flowcharted. Each line of the source program input: is checked character for character for 'reserved words' of the source program language. When a 'reserved word' is found then a shape code is created. The source program input should be compiled and be error free for best results, because if the source code does not pass the compiler restrictions, then the source seen on the screen might not have much meaning. A single program flowchart can be created or by selecting a key word "AUTO", multiple program flowcharts can be created.

The coded output file contains first, second, and third fields. The first field contains a three character shape identifier (the computer software includes 25 predefined shape identifiers). The second field contains a view number and a shape position. The view number indicates a particular flowchart screen for the program flowchart. The shape position indicates a particular position of a flowchart screen. Each flowchart screen can show up to nine shape positions. For example, 1.1 would indicate View 1 Shape Position 1, 1.2 would indicate View 1 Shape Position 2, and 235.3 would indicate View 235 Shape position 3. Field 3 is used for information. This information can relate to the current line or a pointer to the next shape.

The second program of the inventive software reads the coded output file of the first program and displays the program flowchart images screen by screen. The user may sequence through each subsequent flowchart screen by depressing the ENTER key after viewing a particular flowchart screen. The user may also select a particular flowchart screen to view by selecting the command S displayed at the bottom of each screen. The user may also quit the current program by selecting the command Q displayed at the bottom of each screen. At the end of the file, the flowchart can be redisplayed from the beginning by depressing the ENTER key. The user may also generate a hard copy output from an output device.

Accordingly, it is a principal object of the invention to provide computer software for generating flowchart images of a source program.

It is an object of the invention to provide improved elements and arrangements thereof in computer software for generating flowchart images of a source program for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
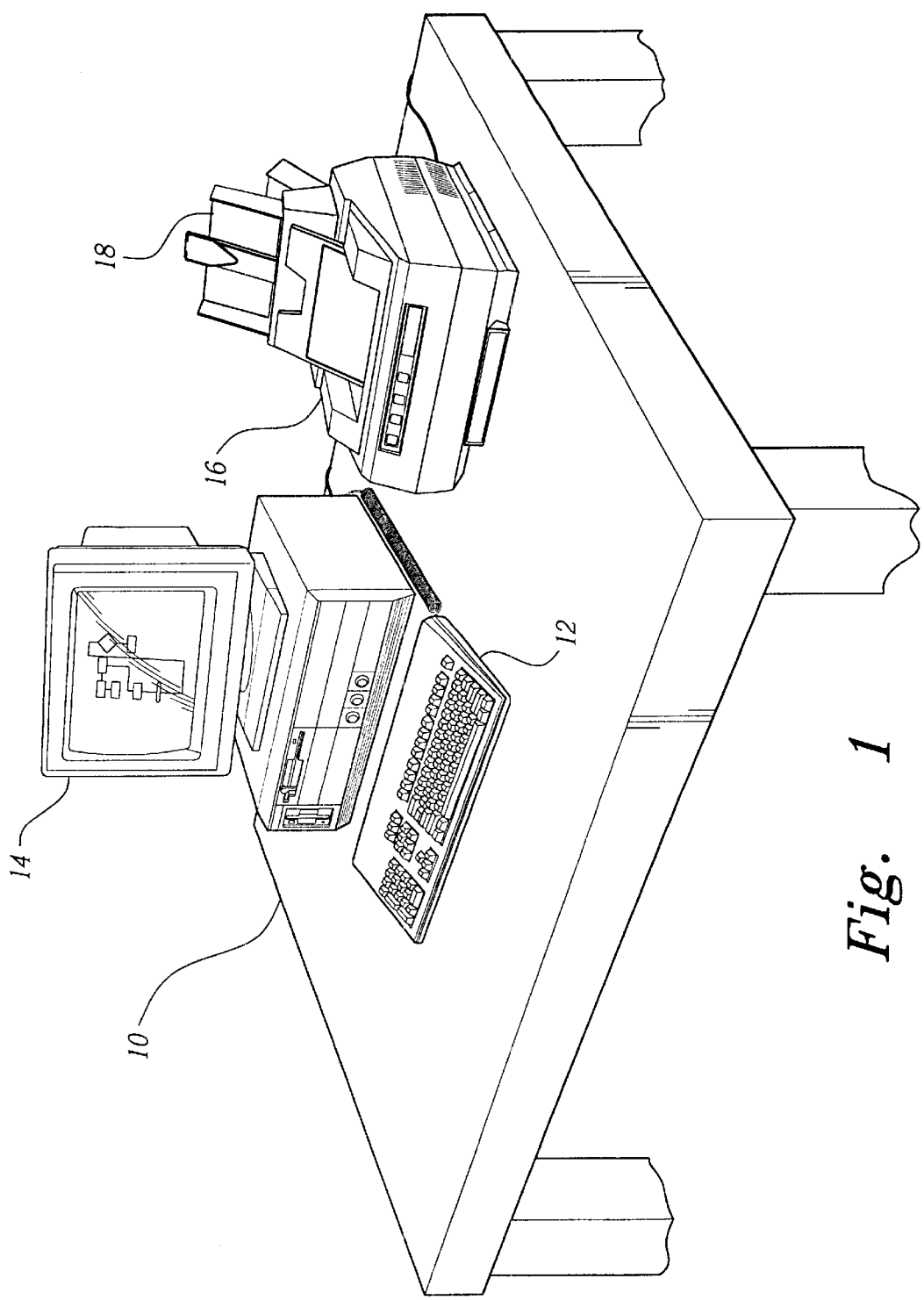
FIG. 1 is a perspective view of a computer system utilizing computer software for generating flowchart images of a source program according to the present invention.

The present invention is computer software for generating flowchart images of a source program. The hardware for implementing the above is not particularly limitative, and the preferred embodiment has been designed for operation on computer systems which normally include a keyboard and/or transducer (mouse) input devices, a resolution monitor, a printer system, a microprocessor-based central processing unit (CPU), and a memory capability, such as a hard disk drive. A conventional computer system containing computer software according to the invention is shown in FIG. 1. The computer system is shown includes a central processing unit (CPU), a display monitor 14, and an alphanumeric keyboard 12. The computer may also include input means in the form of a mouse or trackball (not shown). The illustrated computer system also includes an optional hard copy output device 18 in the form of a printer which is electronically attached to the computer system to provide the user with a hard copy output. The computer system is mounted on a support surface 10, such as a table, desk, or the like. Normally, the memory will store the computer software according to the invention which includes program instructions defining the inventive controlling logic. The CPU implements the programmed control instructions. The inventive controlling logic instructions may be coded in a variety of programming languages consistent and compatible with the associated hardware. The computer software is preferably configured for displaying a COBOL program in the form of a flowchart. However, the computer software may be configured to display any programming language in the form of a flowchart.

Figure 2:
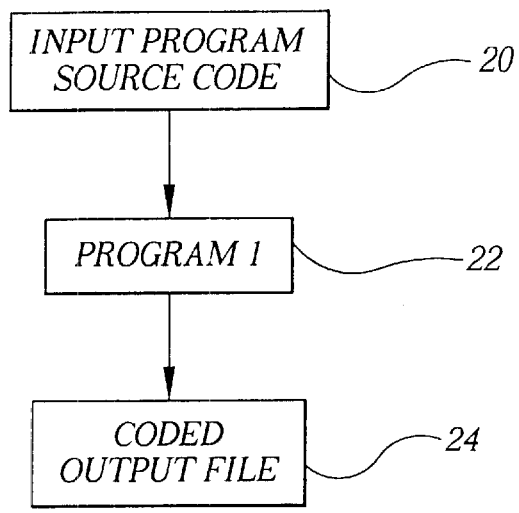
FIG. 2 is a flowchart of one program of the computer software according to the present invention.
Figure 3:
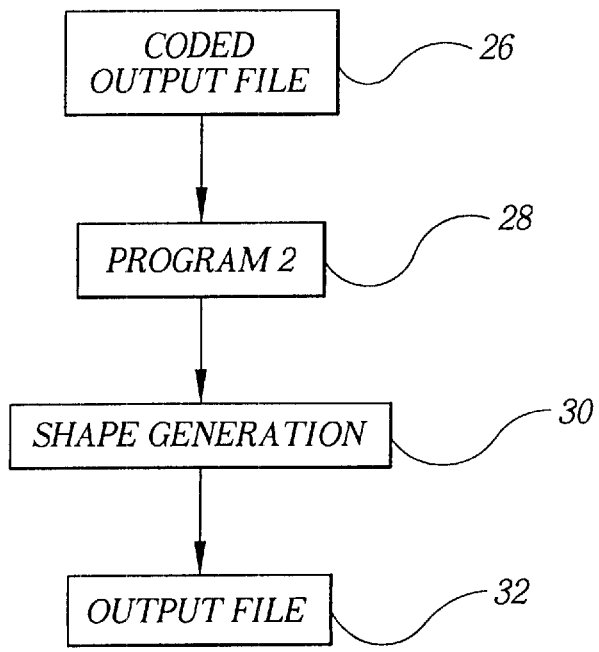
FIG. 3 is a flowchart of a second program of the computer software according to the present invention.

Referring now to FIG. 2, a logic flow chart is presented depicting the overall logic structure associated with a first program of the inventive computer software. System operation conceptually starts with block 20, wherein the user inputs an input program source code. The first program 22 reads the input program source code 20 as an input and a coded output file 24 is written containing codes that the second program 28 uses to create the shapes of the flowchart or list the copybooks and called programs used in the input program source code being flowcharted. Each Line of the source program input is checked character for character for 'reserved words' of the source program language. When a 'reserved word' is found then a shape code is created. The source program input should be compiled and be error free for best results, because if the source code does not pass the compiler restrictions, then the source seen on the screen might not have much meaning. A single program flowchart can be created or by selecting a key word "AUTO", multiple program flowcharts can be created.

The coded output file contains first, second, and third fields. The first field contains a three character shape identifier (the computer software includes 25 predefined shape identifiers). The second field contains a view number and a shape position. The view number indicates a particular flowchart screen for the program flowchart. The shape position indicates a particular position of a flowchart screen. Each flowchart screen can show up to nine shape positions. For example, 1.1 would indicate View 1 Shape Position 1, 1.2 would indicate View 1 Shape Position 2, and 235.3 would indicate View 235 Shape position 3. Field 3 is used for information. This information can relate to the current line or a pointer to the next shape.

The second program of the inventive software reads the coded output file of the first program and displays the program flowchart images screen by screen. The user may sequence through each subsequent flowchart screen by depressing the ENTER key after viewing a particular flowchart screen. The user may also select a particular flowchart screen to view by selecting the command S displayed at the bottom of each screen. The user may also quit the current program by selecting the command Q displayed at the bottom of each screen. At the end of the file, the flowchart can be redisplayed from the beginning by depressing the ENTER key. The user may also generate a hard copy output from an output device.

Figure 4:
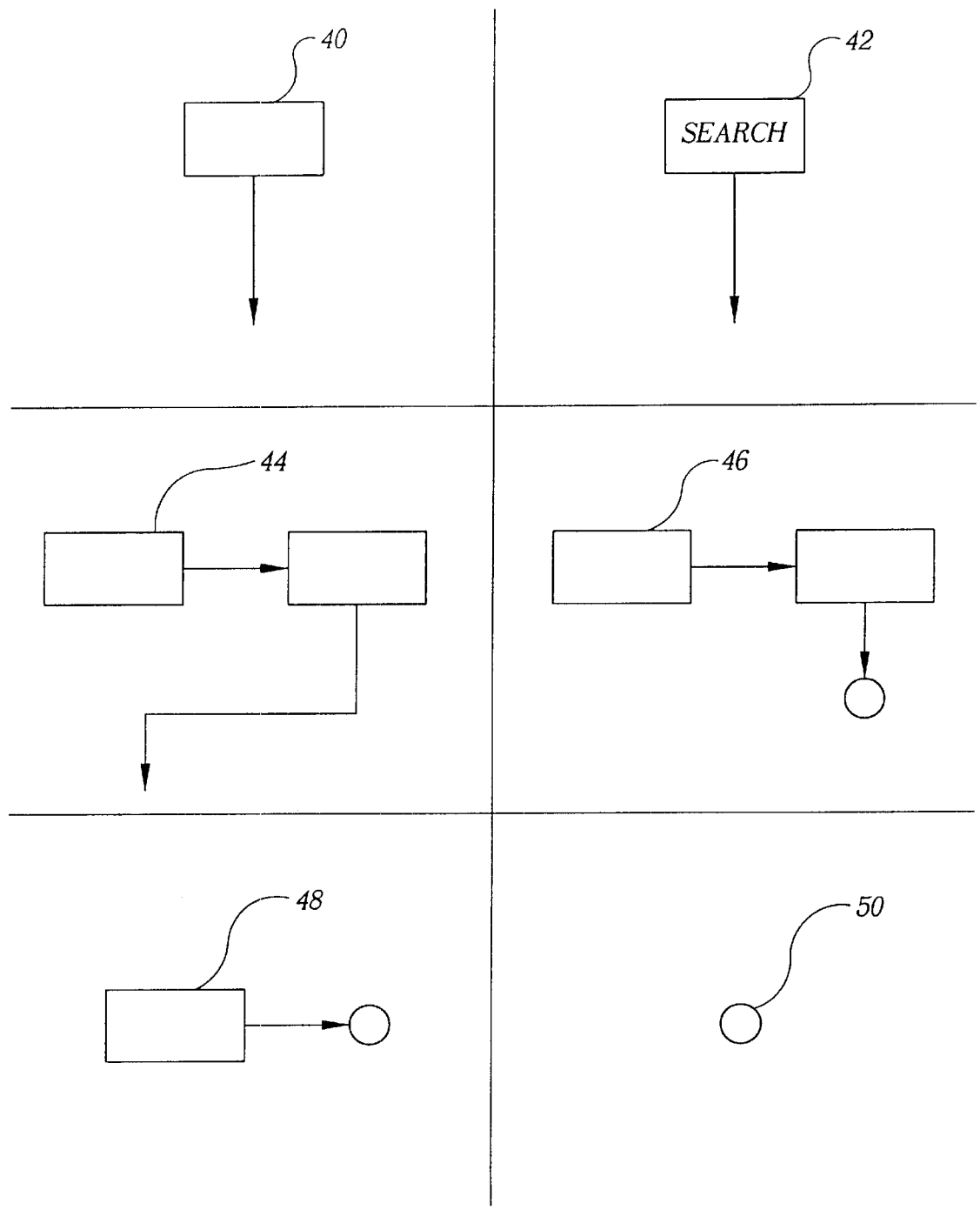
FIG. 4 shows six predefined shapes that may be included in computer software for generating flowchart images of a source program according to the present invention.
Figure 5:
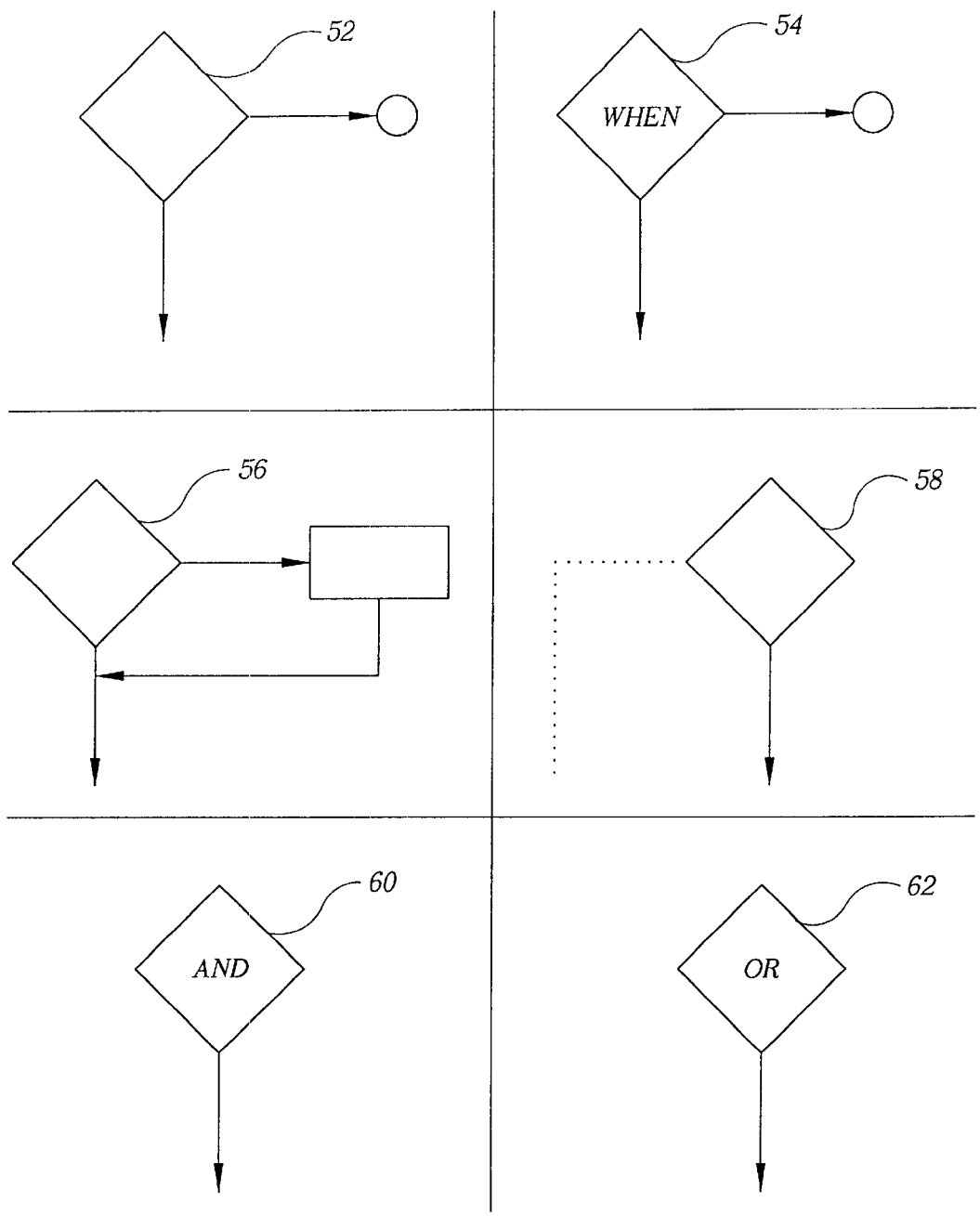
FIG. 5 shows six predefined shapes that may be included in computer software for generating flowchart images of a source program according to the present invention.
Figure 6:
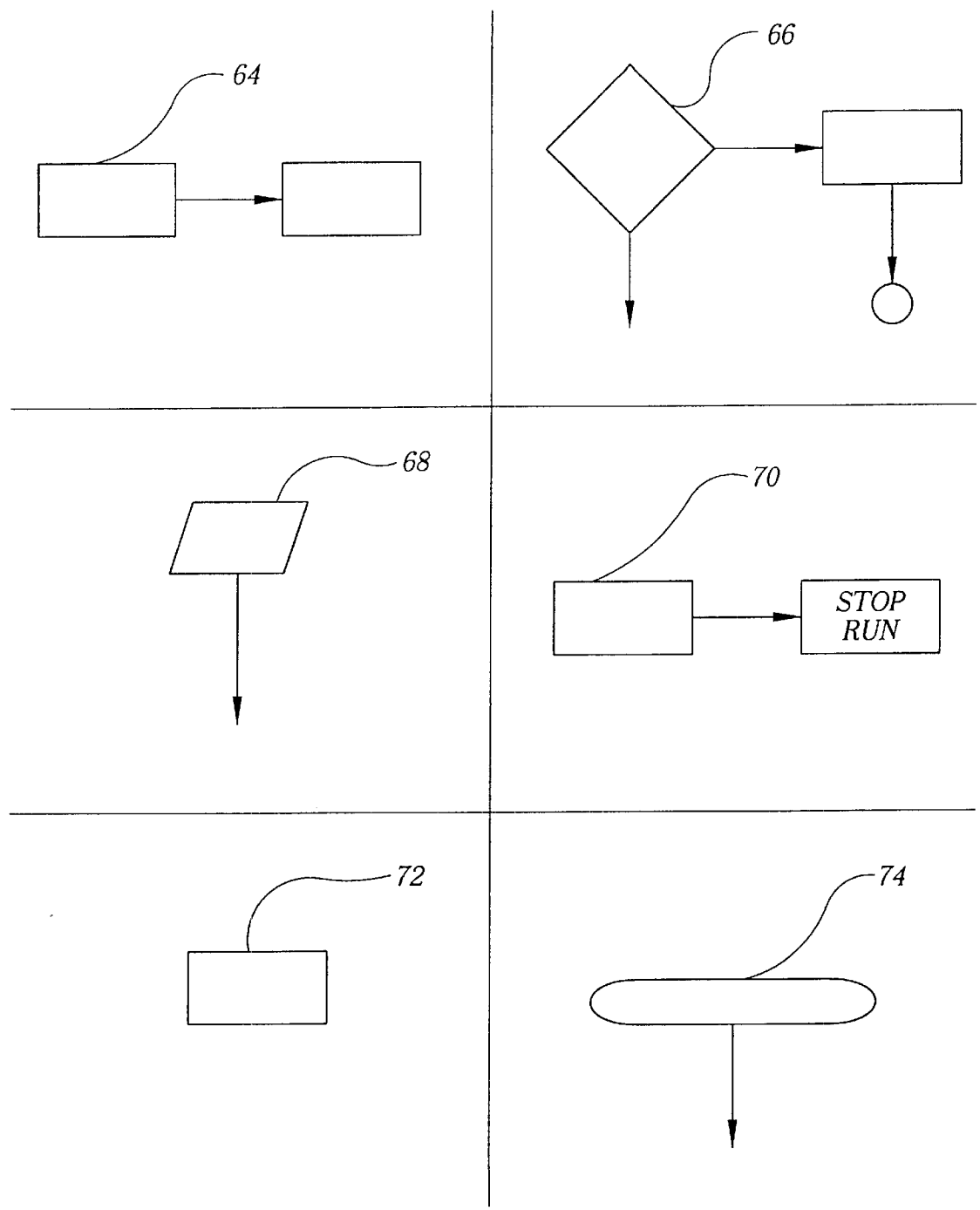
FIG. 6 shows six predefined shapes that may be included computer software for generating flowchart images of a source program according to the present invention.
Figure 7:
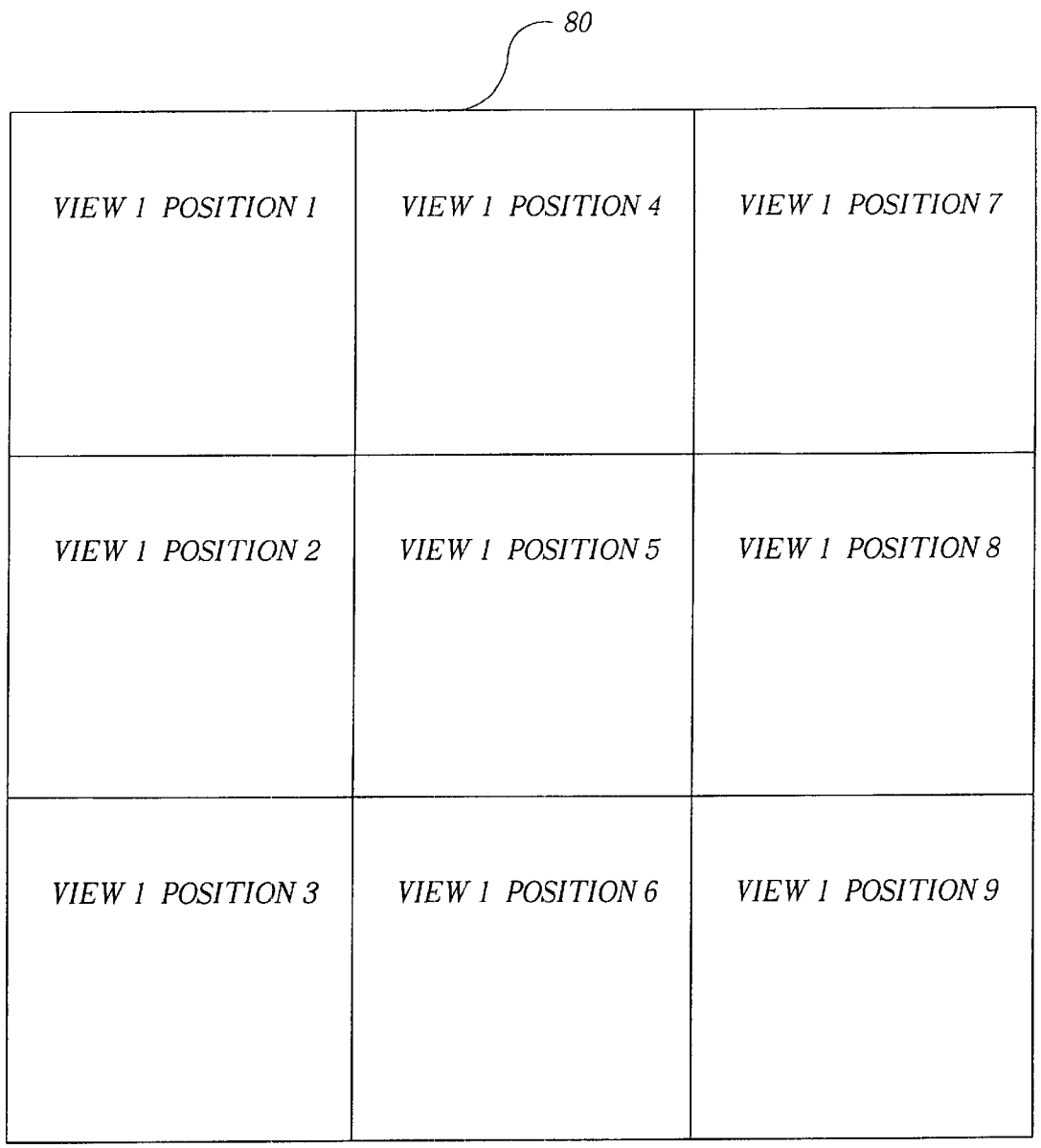
FIG. 7 shows the position numbers of a flowchart screen according to the present invention with nine positions.
Figure 8:
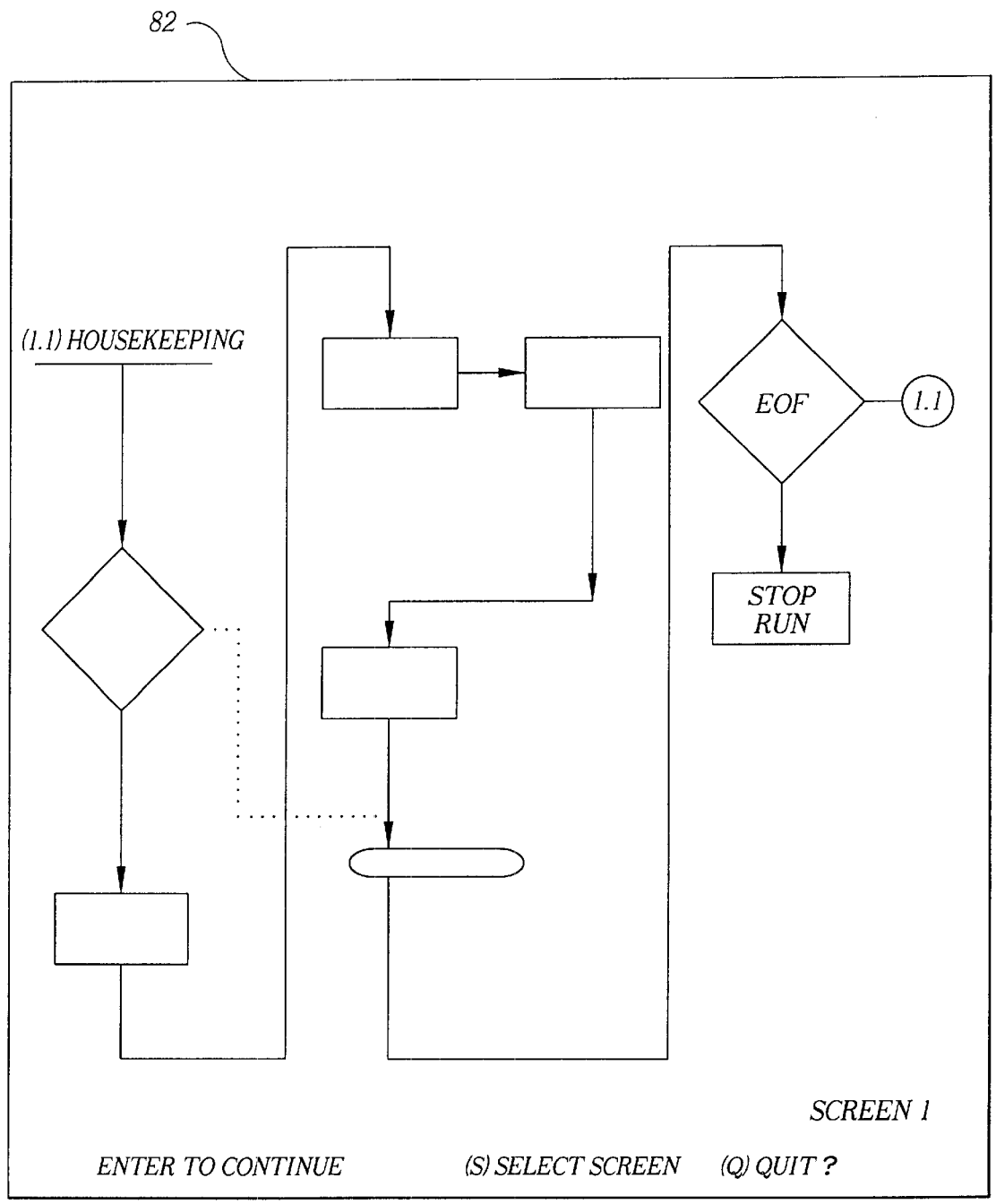
FIG. 8 is an output screen of a flowchart screen generated for an input program source utilizing computer software according to the present invention.

FIGS. 4, 5, and 6 illustrate a variety of predefined shapes 40–74 that may be included in the computer software according to the invention. These shapes include decision shapes, process shapes, and multiple process shapes. FIG. 7 illustrates the position numbers of a flowchart screen 80 with nine positions. FIG. 8 illustrates an output screen 82 of a flowchart screen generated for an input program source.

It is to be understood that the present invention is not limited to the embodiment described above, but encompasses any and all embodiments within the scope of the following claims.

I Claim:

1. A computerized method for generating a flowchart image diagram describing the logic flow of a COBOL or COBOL II, computer computer program's source code, comprising the steps of:

(a) starting operation of a parsing program;

(b) inputting a COBOL or COBOL II, computer program's source code as data into the parsing program;

(c) parsing the program to identify source code languages reserved words in the COBOL or COBOL II, computer program's source code;

(d) generating a shape code for each reserved word identified in the CUBOL or COBOL II, computer progrdin's source code, the shape code identifying a flowchart shape associated with the reserved word;

(e) assigning a location code to each shape code for specifying a position on a output device or a display screen to display the flowchart shape;

(f) producing a coded output file having a plurality of sequential output lines, for each output line consisting of three fields, including a first field having a shape code, a second field having a location code, and a third field;

(g) starting operation of a display generating program;

(h) inputting the output file of said parsing program as data into said display generating program;

(i) converting said shape codes and said location codes into graphical images forming a flowchart image representing a logical structure of the COBOL or COBOL II, computer program's source code and;

(j) outputting the flowchart image to an output device; wherein steps (c) through (f) are performed automatically by said parsing program.

2. The computerized method according to claim 1, wherein step (e) further comprises the steps of assigning each shape code to either a hardcopy or softcopy view and a position within the view.

3. The computerized method according to claim 1, wherein step (j) further comprises outputting the flowchart image to a output device or a screen display device.

4. The computerized method according to claim 1, wherein step (j) further comprises outputting the flowchart image to a output device or a printer.

5. A computer system for generating a flowchart image diagram describing the logic flow of a COBOL or COBOL II, computer program's source code, comprising:

(a) a computer having a processor, a main memory, a storage device, and a bus connecting said processor, said main memory, and said storage device;

(b) an input device connected to said bus;

(c) an output device connected to said bus;

(d) a parsing program code means stored on said storage device for parsing a COBOL or COBOL II, computer program's source code, including;

(i) means for identifying source code language reserved words in the COBOL or COBOL II, computer program's source code;

(ii) means for assigning a shape code to each identified reserved word;

iii) means for assigning a location code to each assigned shape code; and (iv) means for outputting a coded output file having a plurality of sequential output lines, each output line consisting of three fields, including a first field having a shape code, a second field having a location code, and a third field; and (e) a display program code means stored on said storage device for generating a flowchart display, including:

(i) means for inputting the coded output file of said parsing program means as data;

(ii) means for converting said shape codes and said location codes into graphical images forming a flowchart image representing a logical structure of the computer program's source code; and (iii) means for outputting the flowchart image to said output device.

6. The computer system according to claim 5, wherein said means for assigning a location code further comprises means for assigning each shape code to a either a hardcopy or sottcopy view and a position within the view.

7. The computer system according to claim 5, wherein said output device comprises a display monitor.

8. The computer system according to claim 5, wherein said output device comprises a printer.

* * * * *